United States Patent
Frey et al.

[11] Patent Number: 5,865,531
[45] Date of Patent: Feb. 2, 1999

[54] HEADLIGHT FOR VEHICLE

[75] Inventors: Martin Frey, Lichtenstein; Thomas Fabry, Neckartenzlingen, both of Germany

[73] Assignee: Robert Bosch GmbH, Stuttgart, Germany

[21] Appl. No.: 731,838

[22] Filed: Oct. 21, 1996

[30] Foreign Application Priority Data

Oct. 25, 1995 [DE] Germany .................. 195 39 570.0

[51] Int. Cl.$^6$ .............. B60Q 1/06; F21V 33/00; F21V 29/00; F21V 7/20
[52] U.S. Cl. .................. 362/373; 362/96; 362/294; 362/345; 362/487
[58] Field of Search ............... 362/80, 96, 294, 362/345, 373, 265

[56] References Cited

U.S. PATENT DOCUMENTS 4,779,167 10/1988 Nelson ........................ 362/294
5,604,406 2/1997 Gaus ........................... 362/265
5,678,916 10/1997 Watanabe et al. .............. 362/80

FOREIGN PATENT DOCUMENTS

| 93 05229 | 5/1993 | France . |
| 4315394A1 | 11/1994 | Germany . |
| 2 276 714 | 3/1994 | United Kingdom . |
| WO 93/11387 | 11/1992 | WIPO . |

Primary Examiner—Sandra O'Shea
Assistant Examiner—Matthew J. Spark
Attorney, Agent, or Firm—Michael J. Striker

[57] ABSTRACT

A headlight for vehicles has a headlight housing, a light source arranged in the headlight housing, an electrical supply unit provided for the light source and arranged on the headlight housing, the headlight housing in the region of at least a part of the supply unit being provided with an opening, a metallic cooling body closing the opening of the headlight housing, and a cooling body being formed so that the at least a part of the supply unit is arranged inside the headlight housing on the cooling body.

7 Claims, 1 Drawing Sheet

HEADLIGHT FOR VEHICLE

BACKGROUND OF THE INVENTION

The present invention generally relates to a headlight for vehicles.

More particularly, it relates to a headlight for vehicles, with a headlight housing accommodating a gas discharge lamp and provided with an electrical supply for the gas discharge lamp.

Headlights of the above mentioned general type are known in the art. One of such headlights is disclosed for example in the German patent document DE 43 15 394 A1. This headlight has a light source formed as a gas discharge lamp, and also is provided with a headlight housing and electrical supply unit for the gas discharge lamp arranged in the headlight housing. The electrical supply unit has an ignition device and a control device. The control device is located substantially outside the headlight housing and has a housing extending through an opening of the headlight housing. The ignition device is arranged inside the headlight housing and connected by a conductor with the control device as well as with the gas discharge lamp. The control device during the operation of the gas discharge lamp is heated. A cooling of the control device is possible because of its arrangement outside of the headlight housing.

The disadvantage of this construction is that the control device requires a separate, closed and sealed housing, which increases the mounting space and the weight of the headlight.

SUMMARY OF THE INVENTION

Accordingly, it is an object of present invention to provide a headlight for vehicles, which avoids the disadvantages of the prior art.

In keeping with these objects and with others which will become apparent hereinafter, one feature of the present invention resides, briefly stated in a headlight for vehicles, in which the opening of the headlight housing is closable with a metallic cooling body and at least the part of the supply unit is arranged inside the headlight housing on the cooling body.

When the headlight is designed in accordance with the present invention, it eliminates the disadvantages of the prior art. In this headlight, no separate housing is needed for the control device, and despite its arrangement inside the headlight housing, a sufficient cooling is provided.

In accordance with another feature of present invention, at least the part of the supply unit is screened inside the headlight housing at least partially by a metallic screening element from further components of the headlight arranged in the headlight housing.

In accordance with still another feature of present invention, the cooling body outside the headlight housing is provided with outwardly projecting cooling ribs.

The cooling body on the outer side of the headlight can be provided with a flange extending outwardly of the edge of the opening, and a sealing element can be arranged between the outer side of the headlight housing and the flange.

Finally, in accordance with still a further feature of the present invention, the supply unit can be provided with a control device and an ignition device, and the control device is a part of the supply unit arranged on the cooling body.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
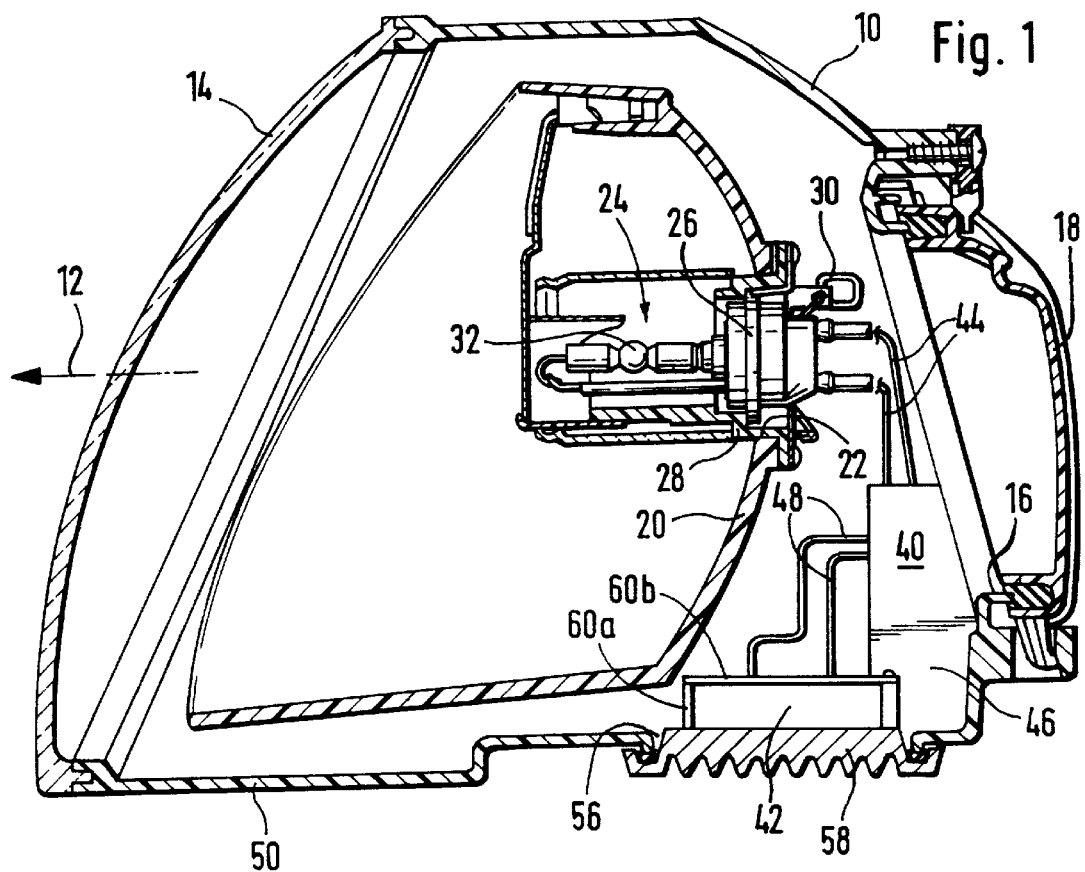
FIG. 1 is a view showing a headlight for vehicles in accordance with present invention in a vertical longitudinal section.
Figure 2:
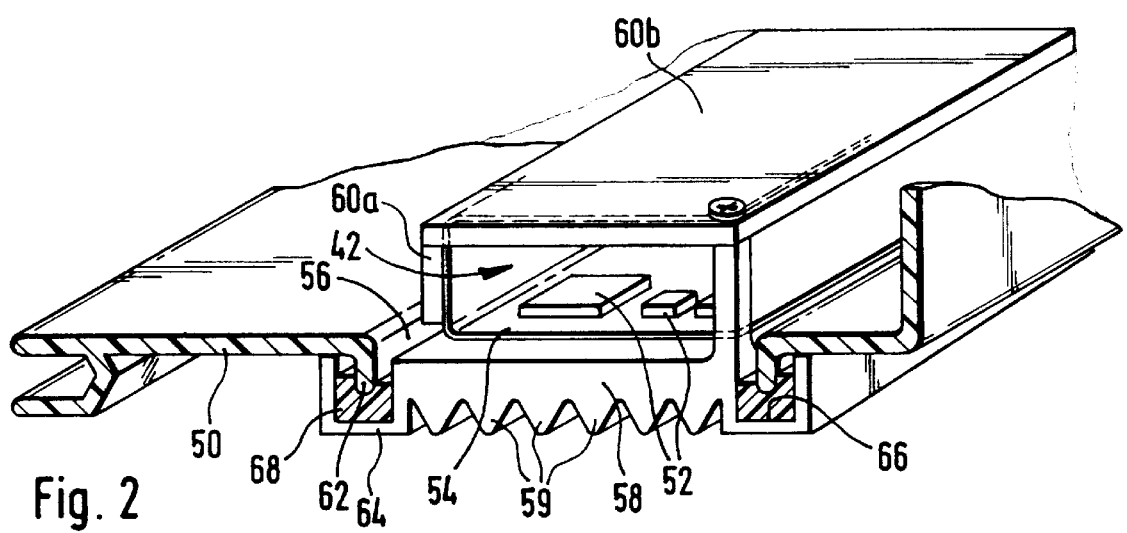
FIG. 2 is a view showing a perspective view of the inventive headlight on an enlarged scale.

A headlight for vehicles in accordance with present invention as shown in FIGS. 1 and 2 can be used in particular for motor vehicles. It has a housing 10 composed for example of a synthetic plastic material. The front end of the headlight housing 10, or in other words, the end which faces a light outlet direction 12, is provided with a light outlet opening. The light outlet opening is closed with a light permeable cover element 14 which can be formed as a disk and composed of synthetic plastic material or glass. The headlight housing 10 has a rear side provided with an opening 16. The opening 16 is closeable by a cap 18. A light source which will be described later on is accessible through this opening.

A reflector 20 is adjustably arranged in the headlight housing 10. It has a shape which is suitable for the application of the headlight and can be composed of synthetic plastic material or metal. The reflector 10 is turnable by a not shown adjusting element abut a horizontal axis and/or a vertical axis, for adjusting the direction of the light bundle emitted from the headlight in vertical and/or horizontal directions. The headlight can be formed as a so-called a projection-principle headlight. A diaphragm for producing a bright-dark limit can be arranged in the light outlet direction 12 after the reflector 20, and then a lense can be arranged after the diaphragm.

A light source 24 is arranged in the reflector 20 in an opening 22 in its apex region. The light source 24 is formed as a gas discharge lamp. The gas discharge lamp 24 has a support 26. The support is received in a lamp carrier 28 mounted on the reflector 20 and held by a mounting element 30. The gas discharge lamp 24 also has a glass bulb 32. The glass bulb extends through the opening 22 of the reflector 20 and has a discharge vessel. A light arc is formed in the discharge vessel during the operation of the gas discharge lamp 24.

For enabling the operation of the gas discharge lamp 24, the headlight also has an electrical current supply unit connected with an electrical system of the motor vehicle. The supply unit has an ignition device 40 and a control device 42. The ignition device 40 is connected through flexible conductors 44 with a gas discharge lamp 24 and operates for igniting the gas discharge lamp 24 to put it in operation. High voltage is generated by the ignition device 40. The ignition device 40 is surrounded by a housing 46 and arranged inside the headlight housing 10, for example on its rear wall. However, it can be mounted directly on the gas discharge lamp 24. A control device 42 is connected with the ignition device 40 by flexible conductors 48 and operates for providing a stable operation of the gas discharge lamp 24 after its ignition. The ignition device 40 and the control device 42 can be assembled in a single unit. The control device 42 is arranged inside the headlight housing 10 near a lower wall 50 and has electrical components 52. The electrical components 52 can be arranged on a flexible conductor foil 54, in which its electrical connections are formed under one another.

The lower wall 50 of the headlight housing 10 is provided, with an opening 56 for example in the region of the control device 42. The opening 56 is closeable by a metallic cooling body 58. The opening 56 can be formed in any point of the headlight housing 10, for example in a side wall or a rear wall, depending on where the control device 42 is arranged. The control device 42, or in other words its components 52 or the conductor foil 54, is located on the inner wall of the cooling body 58 facing the headlight housing 10. Therefore, good heat transfer from the control device 42 to the cooling body 58 is guaranteed. In the above described manner, a combined ignition and control device can be arranged on the cooling body 58.

The cooling body is provided preferably on its outer side with the outwardly projecting cooling ribs 59 to increase the outer surface. A screening element 60a, b, for example formed as a plate, can be connected with a cooling body 58 inside the headlight housing 10. Together with the cooling body 58, the screening element 60a, b surrounds partially the control device 42. By means of the screening element 60a, b the heat emitted by the control device 42 is kept far from the reflector 20 and the gas discharge lamp 24 and withdrawn to the cooling body 58. In the shown example, the screening element is composed of two metal plates 60a, b which are arranged in an L-like manner. The plate 60a at the front edge of the cooling body 58 facing the light outlet direction 20 is arranged substantially perpendicular to the wall while at the plate 60b is arranged at a distance above the wall 50 and substantially parallel to it.

A collar 62 extends outwardly from the wall 50 of the headlight housing 10 and surrounds the opening 56. The cooling body 58 has a flange 64 extending over the opening 56. A circular groove 66 is formed on the flange 64 of the cooling body 58 and faces toward the headlight housing 10. An elastic sealing element 68 is accommodated in the groove 66. When the cooling body 58 is mounted on the headlight housing 10, the collar 62 abuts against the sealing element 68 and is depressed in it with elastic compression of the sealing element so that the headlight housing 10 is sealed. The sealing element 68 can be foamed on the headlight housing 10 or on the cooling body 58, or injection molded of one piece with the headlight housing 10. The cooling body 58 can be mounted on the headlight housing 10 for example by one or several screws, by an arresting connection, or in other known ways.

The cooling body 58 in the opening 56 can have any shape, for example a rectangular shape as shown in the example, or a rounded shape. The cooling body 58 has a sufficiently great surface for reliably withdrawing the produced heat. The cooling body 58 can extend over the whole longitudinal extension of the headlight housing 10 between its front edge and its rear side. On the other hand, it is also possible that it extends only over a part of the longitudinal extension of the headlight housing. In the lateral direction, the cooling body can extend over the whole width of the headlight housing 10 or only a part of its width.

It will be understood that each of the elements described above, or two or more together, may also find a useful application in other types of headlights differing from the types described above.

While the invention has been illustrated and described as embodied in headlight housing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A headlight for vehicles, comprising a headlight housing; a light source arranged in said headlight housing; an electrical supply unit provided for said light source and arranged on said headlight housing, said headlight housing in a region of at least a part of said supply unit being provided with an opening; a metallic cooling body closing said opening of said headlight housing; and a cooling body formed so that said at least a part of said supply unit is arranged inside said headlight housing on said cooling body, said light source being a gas discharge lamp located in said headlight housing, said cooling body being provided with a flange located at an outer side of said headlight housing and extending over an edge of said opening; and a sealing element arranged between the outer side of the headlight housing and said flange.

2. A headlight for vehicles as defined in claim 1, wherein said supply unit has an ignition device and a control device, said control device is a part of said supply unit arranged on said cooling body.

3. A headlight for vehicles, comprising a headlight housing; a light source arranged in said headlight housing; an electrical supply unit provided for said light source and arranged on said headlight housing, said headlight housing in a region of at least a part of said supply unit being provided with an opening; a metallic cooling body closing said opening of said headlight housing; and a cooling body formed so that said at least a part of said supply unit is arranged inside said headlight housing on said cooling body, said supply unit having an ignition device and a control device, said control device being a part of said supply unit arranged on said cooling body.

4. A headlight for vehicles as defined in claim 3, wherein said light source is a gas discharge lamp located in said headlight housing.

5. A headlight for vehicles as defined in claim 3, and further comprising a metallic screening element arranged inside said headlight housing and at least partially screening at least said part of said supply unit from other components located inside said headlight housing.

6. A headlight for vehicles as defined in claim 3, wherein said cooling body is provided outside of said headlight housing with outwardly projecting cooling ribs.

7. A headlight for vehicles as defined in claim 3, wherein said cooling body is provided with a flange located at an outer side of said headlight housing and extending over an edge of said opening; and a sealing element arranged between the outer side of the headlight housing and said flange.

* * * * *